US008479501B2

(12) United States Patent
McCarthy, Jr.

(10) Patent No.: US 8,479,501 B2
(45) Date of Patent: Jul. 9, 2013

(54) EXHAUST COOLING MODULE FOR SCR CATALYSTS

(75) Inventor: James Edward McCarthy, Jr., Canton, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 423 days.

(21) Appl. No.: 12/762,157

(22) Filed: Apr. 16, 2010

(65) Prior Publication Data

US 2011/0011060 A1 Jan. 20, 2011

Related U.S. Application Data

(60) Provisional application No. 61/226,880, filed on Jul. 20, 2009.

(51) Int. Cl.
*F01N 3/10* (2006.01)

(52) U.S. Cl.
USPC .................. 60/301; 60/295; 60/316; 60/317

(58) Field of Classification Search
USPC .................. 60/317, 319, 285, 295, 315, 316, 60/301
See application file for complete search history.

(56) References Cited

U.S. PATENT DOCUMENTS

| | | | | |
|---|---|---|---|---|
| 1,560,947 A * | 11/1925 | Skelton | ................. | 181/263 |
| 3,908,371 A | 9/1975 | Nagai et al. | | |
| 3,973,916 A * | 8/1976 | Shelton | ................. | 422/174 |
| 4,050,903 A * | 9/1977 | Bailey et al. | ................. | 422/177 |
| 4,094,645 A * | 6/1978 | Bailey | ................. | 422/180 |
| 4,216,654 A * | 8/1980 | Pletts | ................. | 60/311 |
| 5,388,403 A | 2/1995 | Nagami et al. | | |
| 5,404,719 A | 4/1995 | Araki et al. | | |
| 5,771,682 A * | 6/1998 | Simons | ................. | 60/274 |
| 6,766,642 B2 | 7/2004 | Binder et al. | | |
| 7,213,395 B2 | 5/2007 | Hu et al. | | |
| 7,251,929 B2 | 8/2007 | Hu et al. | | |
| 7,316,109 B2 | 1/2008 | Clerc et al. | | |
| 7,337,607 B2 | 3/2008 | Hou et al. | | |
| 7,337,789 B2 | 3/2008 | Kupferberg | | |
| 7,458,208 B1 * | 12/2008 | Dando et al. | ................. | 60/316 |
| 8,046,989 B2 * | 11/2011 | VanderGriend et al. | ........ | 60/317 |
| 8,166,752 B2 * | 5/2012 | Garcia et al. | ................. | 60/308 |
| 2002/0004024 A1 | 1/2002 | Hertzberg | | |
| 2004/0050037 A1 | 3/2004 | Betta et al. | | |
| 2006/0179824 A1 | 8/2006 | Roser | | |
| 2007/0028601 A1 | 2/2007 | Duvinage et al. | | |
| 2007/0079605 A1* | 4/2007 | Hu et al. | ................. | 60/295 |
| 2008/0022664 A1* | 1/2008 | Reuter et al. | ................. | 60/286 |
| 2008/0087006 A1* | 4/2008 | Wu et al. | ................. | 60/280 |
| 2008/0092533 A1 | 4/2008 | Tennison | | |

(Continued)

*Primary Examiner* — Thomas Denion
*Assistant Examiner* — Patrick Maines
(74) *Attorney, Agent, or Firm* — Paul V. Keller

(57) ABSTRACT

An exhaust aftertreatment system having a $NO_X$ absorber-catalyst and an ammonia-SCR reactor. During regenerations, the $NO_X$ absorber-catalyst generates ammonia. The ammonia-SCR reactor captures this ammonia and later uses it to reduce $NO_X$. A Venturi is provided in an exhaust conduit connecting the $NO_X$ absorber-catalyst to the ammonia-SCR reactor. The Venturi draws sufficient air to keep the ammonia-SCR reactor under lean conditions throughout the $NO_X$ absorber-catalyst regenerations. Maintaining lean conditions for the ammonia-SCR reactor in this manner mitigates poisoning of the ammonia-SCR reactor by hydrocarbons slipping from the $NO_X$ absorber-catalyst during the regenerations. Mitigating this poisoning improves the performance of the exhaust aftertreatment system and reduce the loss of useful ammonia to oxidation.

18 Claims, 11 Drawing Sheets

U.S. PATENT DOCUMENTS

| | | |
|---|---|---|
| 2008/0163610 A1 | 7/2008 | Baird et al. |
| 2008/0209894 A1 | 9/2008 | Persson |
| 2010/0050613 A1* | 3/2010 | Bailey .............................. 60/287 |
| 2010/0170225 A1* | 7/2010 | Opris et al. ...................... 60/286 |
| 2010/0212292 A1* | 8/2010 | Rusch et al. ..................... 60/274 |
| 2010/0236224 A1* | 9/2010 | Kumar et al. .................... 60/297 |

* cited by examiner

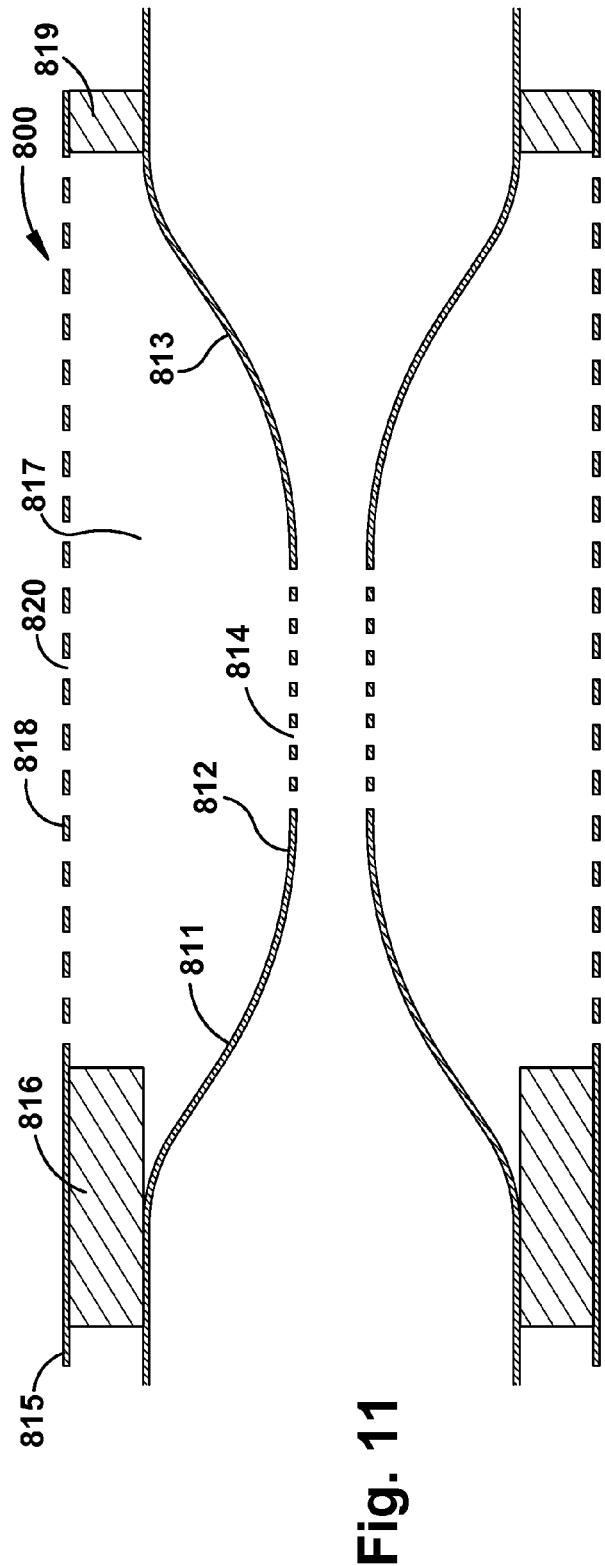
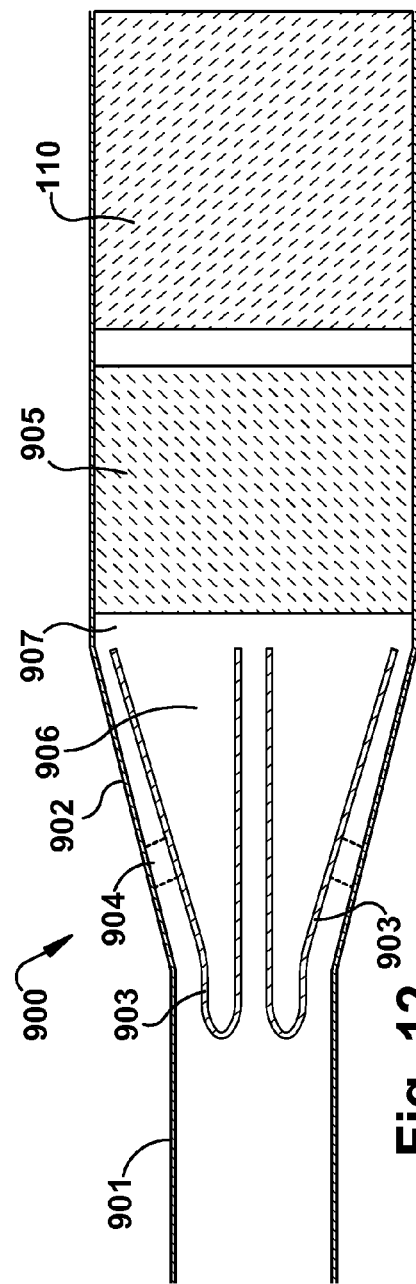
Fig. 11
Fig. 12

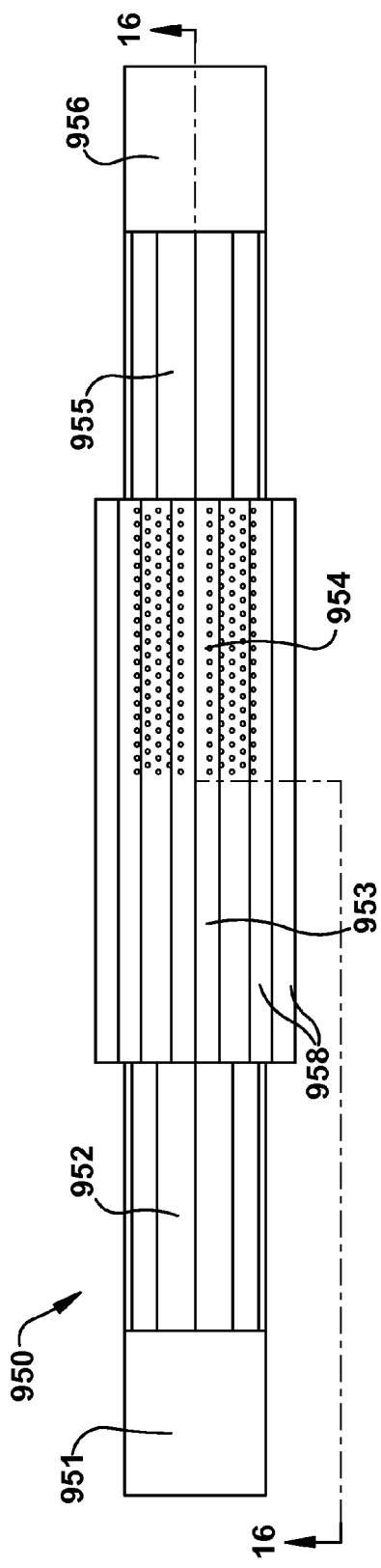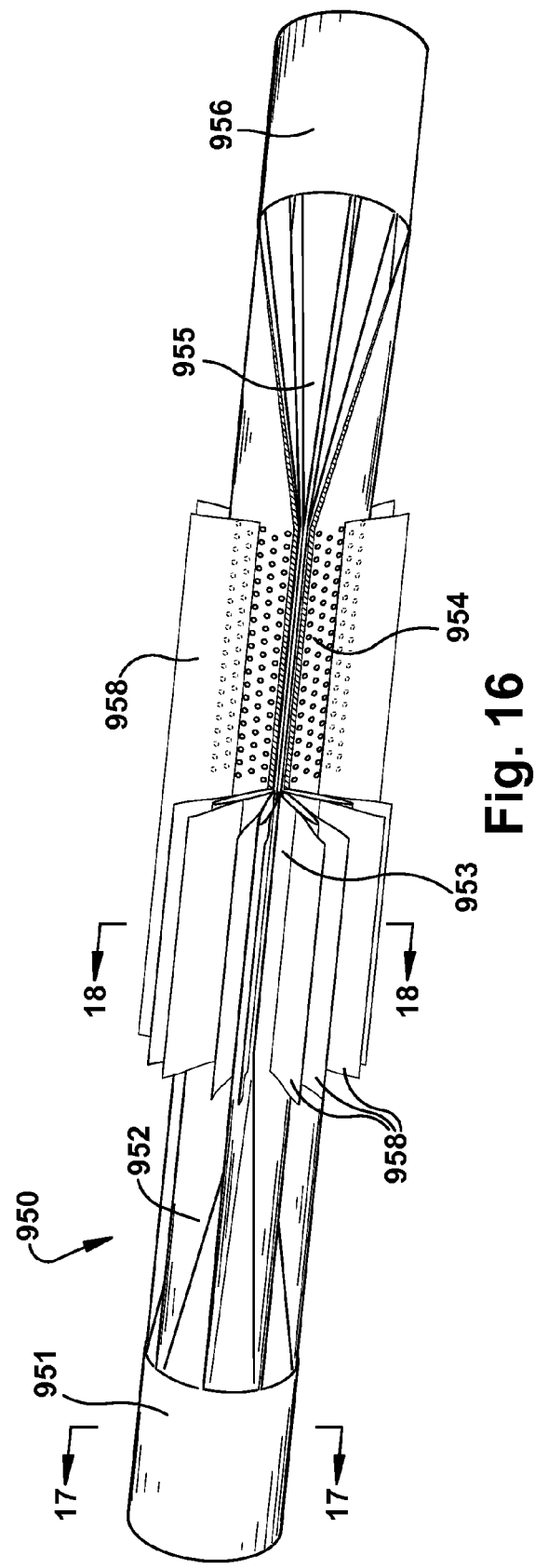

EXHAUST COOLING MODULE FOR SCR CATALYSTS

PRIORITY

This application claims priority from U.S. Provisional Application No. 61/226,880, filed Jul. 20, 2009.

FIELD OF THE INVENTION

The present invention relates to diesel engine exhaust aftertreatment systems.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling $NO_x$ emissions from diesel-powered vehicles. One set of approaches focuses on the engine. Techniques such as exhaust gas recirculation and partially homogenizing fuel-air mixtures are helpful, but these techniques alone will not eliminate $NO_x$ emissions. Another set of approaches remove $NO_x$ from the vehicle exhaust. These include the use of lean-burn $NO_x$ catalysts, selective catalytic reduction (SCR) catalysts, and lean $NO_x$ traps (LNTs).

Lean-burn $NO_x$ catalysts promote the reduction of $NO_x$ under oxygen-rich conditions. Reduction of $NO_x$ in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean $NO_x$ reduction, introducing a fuel economy penalty of 3% or more. Currently, peak $NO_x$ conversion efficiencies for lean-burn $NO_x$ catalysts are unacceptably low.

SCR generally refers to selective catalytic reduction of $NO_x$ by ammonia. The reaction takes place even in an oxidizing environment. The $NO_x$ can be temporarily stored in an absorbent or ammonia can be fed continuously into the exhaust. SCR can achieve high levels of $NO_x$ reduction, but there is a disadvantage in the lack of infrastructure for distributing ammonia or a suitable precursor. Another concern relates to the possible release of ammonia into the environment.

LNTs are devices that adsorb $NO_x$ under lean conditions and reduce and release the adsorbed $NO_x$ under rich conditions. An LNT generally includes a $NO_x$ adsorbent and a catalyst. The adsorbent is typically an alkali or alkaline earth compound, such as $BaCO_3$ and the catalyst is typically a combination of precious metals including Pt and Rh. In lean exhaust, the catalyst speeds oxidizing reactions that lead to $NO_x$ adsorption. In a reducing environment, the catalyst activates reactions by which hydrocarbon reductants are converted to more active species, the water-gas shift reaction, which produces more active hydrogen from less active CO, and reactions by which adsorbed $NO_x$ is reduced and desorbed. In a typical operating protocol, a reducing environment will be created within the exhaust from time-to-time to regenerate (denitrate) the LNT.

Regeneration to remove accumulated NOx may be referred to as denitration in order to distinguish desulfation, which is carried out much less frequently. The reducing environment for denitration can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, when valves are not used, a portion of the reductant is generally expended to consume excess oxygen in the exhaust. The reducing agent reacts with oxygen and substantially consumes it. The reactions between reductants and oxygen can take place in the LNT, but it is generally preferred for the reactions to occur in a catalyst upstream from the LNT so that the heat of reaction does not cause large temperature increases within the LNT at every regeneration. To lessen the amount of excess oxygen and reduce the amount of reductant expended consuming excess oxygen, the engine may be throttled, although such throttling may have an adverse effect on the performance of some engines.

WO 2004/090296 describes a diesel automotive exhaust aftertreatment system with a fuel reformer configured within an exhaust line upstream from LNT and SCR catalysts. The reformer has a high thermal mass. The reformer uses Pt and Rh to produce syn gas from diesel fuel at exhaust gas temperatures. For the reformer to be operative at exhaust gas temperatures, a relatively large amount of catalyst must be used to provide enough catalyst activity. The reformer both removes excess oxygen and converts the diesel fuel reductant into more reactive reformate.

U.S. Pat. Pub. No. 2004/0050037 (hereinafter "the '037 publication") describes a different type of fuel reformer placed in the exhaust line upstream from an LNT. The reformer includes both oxidation and steam reforming catalysts. Pt and/or Pd serves as the oxidation catalyst. Rh serves as the reforming catalyst. The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby the injected fuel combusts to generate heat. After warm up, the fuel injection rate is increased and or the oxygen flow rate reduced to provide a rich exhaust. U.S. Pat. No. 7,213,395 describes an exhaust aftertreatment system comprising a similar reformer-LNT system, but with an SCR reactor configured downstream from the LNT.

Designing the fuel reformer to heat and operate at least partially through steam reforming reactions as opposed to operating at exhaust stream temperatures reduces the catalyst requirement, increases the reformate yield, and reduces the amount of heat generation. In principal, if reformate production proceeds through partial oxidation reforming as in the reaction:

$$CH_{1.85} + 0.5O_2 \rightarrow CO + 0.925H_2 \quad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \quad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust. Nevertheless, the benefits are sufficient that a low thermal mass reformer that must be preheated to operate effectively is preferred over a large thermal mass reformer that does not require preheating.

In spite of advances, there continues to be a long felt need for an affordable and reliable diesel exhaust aftertreatment system that is durable, has a manageable operating cost (including fuel penalty), and reduces $NO_X$ emissions to a satisfactory extent in the sense of meeting U.S. Environmental Protection Agency (EPA) regulations effective in 2010 and other such regulations that will limit $NO_x$ emissions from trucks and other diesel-powered vehicles. Manufacturers and researchers have put considerable effort toward meeting those regulations.

SUMMARY

One of the inventor's concepts relates to an exhaust aftertreatment system comprising a $NO_X$ absorber-catalyst and an ammonia-SCR reactor. During regenerations, the $NO_X$ absorber-catalyst generates ammonia that is captured and later used by the ammonia-SCR reactor to reduce $NO_X$. A Venturi is provided in the exhaust conduit between the $NO_X$ absorber-catalyst and the ammonia-SCR reactor. The Venturi draws sufficient air to keep the ammonia-SCR reactor under lean conditions throughout the $NO_X$ absorber-catalyst regenerations. Maintaining lean conditions for the ammonia-SCR reactor in this manner can mitigate poisoning of the ammonia-SCR reactor by hydrocarbons that slip from the $NO_X$ absorber-catalyst during regeneration. Mitigating this poisoning improves the performance of the exhaust aftertreatment system and reduces the loss of useful ammonia to oxidation.

Other concepts disclosed herein include forming a Venturi in an exhaust pipe bend, using a pressure actuated check-valve to prevent exhaust leaking from the Venturi, using ram air to enhance air uptake by the Venturi, an exhaust pipe sleeve useful for capturing ram air, a cyclonic air filtration unit for the Venturi air intake, a diffuser manifold for distributing the Venturi intake air evenly into the exhaust flow, a convoluted Venturi neck that improves the distribution of intake air, and a convoluted Venturi neck, with optional heat radiating fins, for cooling the exhaust. Each of these concepts can be used together with each of the others, or separately.

The primary purpose of this summary has been to present the concepts in a simplified form to facilitate understanding of the more detailed description that follows. This summary is not a comprehensive description of every one of the inventors concepts or every combination of the inventors concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claim as his invention being reserved for the claims that follow.

BRIEF DESCRIPTION OF THE DRAWINGS

FIG. 11 is a sketch of an exemplary Venturi providing cyclonic filtration of intake air.

FIG. 12 is a sketch of an exemplary Venturi formed in the entrance cone for an SCR reactor.

FIG. 15 is a sketch of another exemplary Venturi.

FIG. 16 is a perspective of FIG. 15 with a partial cross section taken along line 16-16.

DETAILED DESCRIPTION

Figure 1:
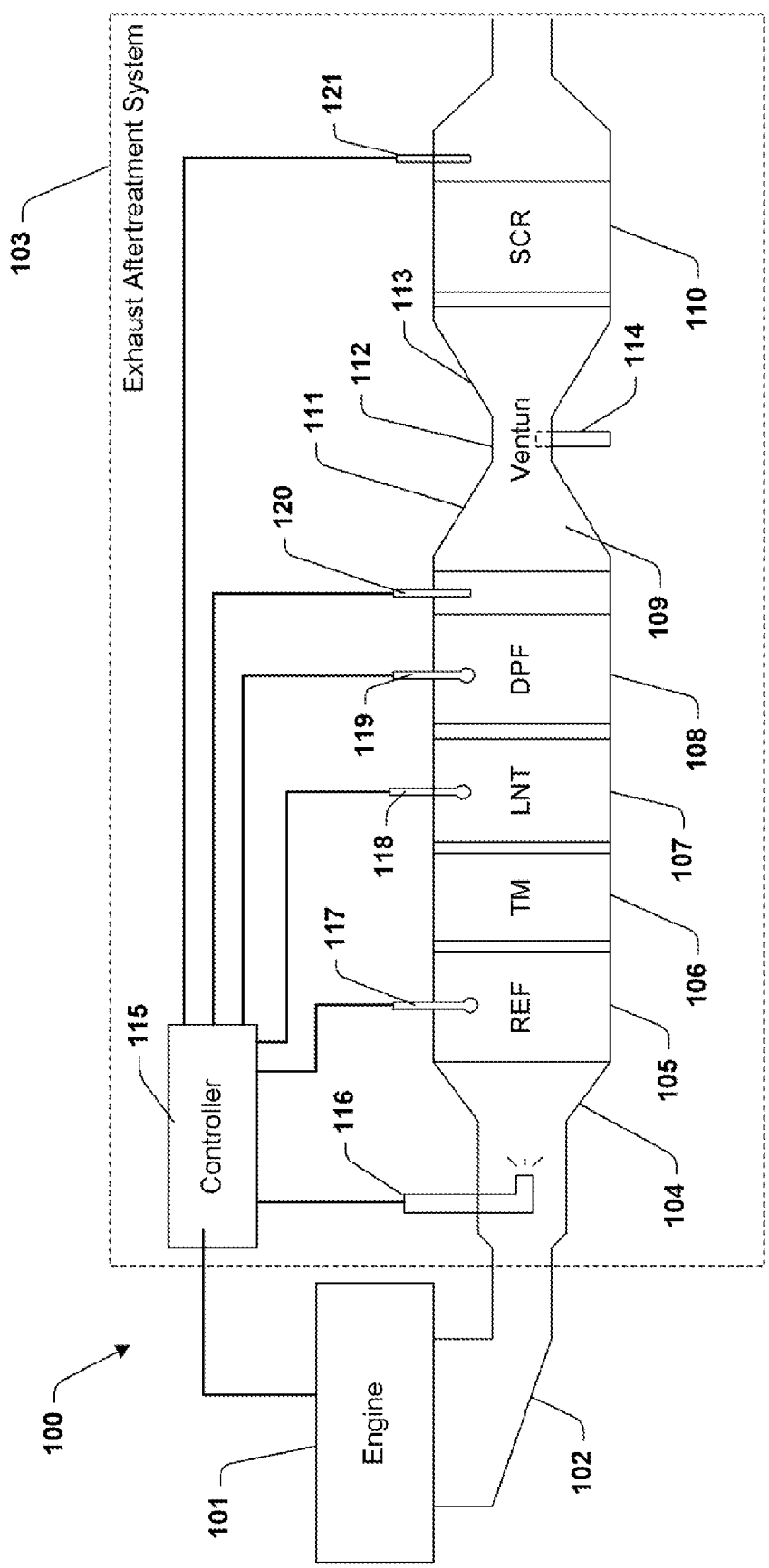
FIG. 1 is a schematic illustration of an exemplary exhaust aftertreatment system.

FIG. 1 is a schematic illustration of an exemplary power generation system 100. The system 100 is adapted to mobile power generation systems, especially diesel-fueled power generation systems for medium and heavy duty trucks, but can also be used for stationary power generation.

The power generation system 100 includes a compression ignition diesel internal combustion engine 101 connected by an exhaust manifold 102 to an exhaust aftertreatment system 103. The exhaust aftertreatment system 103 comprises an exhaust line fuel injector 116, an in-line fuel reformer 105, a monolith-structure thermal mass 106, a lean NOx trap (LNT) 107, a diesel particulate filter (DPF) 108, a Venturi 109, an ammonia-SCR reactor 110, and a controller 115. In this example, the controller 115 is also a control unit for the engine 101, but separate units can be used for these purposes. Temperature sensors 117-119, pressure sensor 120, and $NO_X$ sensor 121 all provide information to the controller 115.

The Venturi 109 is formed in the exhaust line 104 that contains the foregoing exhaust aftertreatment devices. The Venturi 109 comprises a constriction zone 111 through which the cross-sectional area available for exhaust flow becomes reduced, a neck zone 112 to which an air intake 114 connects, and an expansion zone 113 through which the cross-sectional area available for exhaust flow exhaust re-expands. The constriction zone 111 and the expansion zone 113 can be replaced with abrupt transitions, but this is not recommended.

Preferably the exhaust aftertreatment system 104 provides a static flow path for the exhaust from the internal combustion engine 101. A static flow path is one that remains fixed while the power generation system 100 is operating. The aftertreatment system 104 preferably lacks exhaust line valves or dampers for dynamically controlling the path or volumetric flow distribution of the exhaust passing through the system 104. The term dynamic control is used to distinguish parts that are designed to move during operation of the exhaust aftertreatment system 104 from parts that may be adjusted by a factory or at a maintenance interval. Dynamically moving exhaust line dampers and especially valves are preferably avoided because such devices are susceptible to failure and would decrease the system 103's durability and reliability Preferably, the entire exhaust flow from the engine 101 passes through the fuel reformer 105 and the Venturi 109. Passing the entire exhaust flow through the fuel reformer 105 allows the fuel reformer 105 to eliminate all the excess oxygen from the exhaust when sufficient reductant is made available. Passing the entire exhaust flow through the Venturi 109 provides the highest degree of air dilution for a given amount of back-pressure.

The exhaust line fuel injector 116 is functional to selectively inject fuel into the exhaust line 104 under the direction of the controller 115. Exhaust line fuel injection can be used to heat and regenerate the LNT 107 and the DPF 108. A preferred fuel injector comprises an atomizing spray nozzle having a check valve. The spray is preferably vaporized by the injection process. If the spray does not entirely vaporize, the spray is preferably oriented to impinge on a downstream catalyst as opposed to exhaust pipe walls. To prevent clogging of the valve, it is preferred that the nozzle be cooled. Clogging can also be prevented by clearing the nozzle with pulses of air between periods of fuel injection.

A preferred method of cooling the nozzle uses an excess fuel flow. An excess fuel flow is a flow of fuel to the nozzle that is returned to a fuel reservoir rather than injected. The excess fuel carries heat away from the nozzle. One way of providing an excess fuel flow uses most of the channels to and inside the nozzle that are used for fuel injection into the exhaust line 104. Between periods of injection into the exhaust line 104, a return flow path is open. Between injections, a check valve prevents fuel flow from the nozzle to the exhaust line 104 and fuel is provided to the nozzle at a pressure below the pressure that would open that check valve.

The exhaust line fuel injector 116 preferably controls the flow of fuel from a pressurized fuel source to the exhaust line 104 using a pulse width modulated solenoid valve. The solenoid valve is preferably placed at some distance from the exhaust line 104 in order to prevent the solenoid valve from being excessively heated by the exhaust. A tube channels fuel from the solenoid valve to the nozzle.

The fuel reformer 105 processes the fuel-injected exhaust. The exhaust from the engine 101 is normally lean. Typically, the engine 101 is a compression ignition diesel engine producing an exhaust having an oxygen concentration that varies between 6 and 15%. The fuel reformer 105 comprises an oxidation catalyst. The oxidation catalyst typically comprises one or more precious metals such as platinum and palladium dispersed on the high surface area metal oxide, alumina doped with lanthanum for example, although any suitable oxidation catalyst can be used. The oxidation catalyst typically has a minimum operating temperature in the range from 200 to 300° C., typically about 250° C. When the fuel reformer 105 is above this minimum operating temperature and the fuel injector 116 is providing the exhaust with fuel, the oxidation catalyst will oxidize at least a part of the fuel. Oxidation of injected fuel generates heat.

Preferably the fuel reformer 105 includes a steam reforming catalyst as well as an oxidation catalyst. A steam reforming catalyst is one that catalyzes reforming reactions between water and hydrocarbons. The exhaust from the engine 101 typically includes steam, which is one of the principle products of hydrocarbon fuel combustion. A reforming catalyst typically comprises at least one precious metal such as rhodium dispersed on the high surface area metal oxide, zirconium doped with lanthanum for example, although any suitable reforming catalyst can be used. The reforming catalyst typically has a minimum operating temperature in the range from 450 to 550° C., typically about 500° C. When the fuel reformer 105 is above this minimum operating temperature and the fuel injector 116 is making the exhaust rich by providing the exhaust with fuel at a rate in excess of stoichiometric with respect to the exhaust oxygen flow rate, the fuel reformer 105 will catalyze reactions that consume the bulk of the oxygen in the exhaust and reform a portion of the injected fuel to produce reformate, especially hydrogen and carbon monoxide. Steam reforming is endothermic. The inclusion of the steam reforming catalyst is preferred because it enhances the efficiency with which reformate is formed in comparison with only partial oxidation reforming. In addition, endothermic steam reforming reactions help stabilize the temperature of the fuel reformer 105 during fuel reforming operation.

A stoichiometric amount of hydrocarbon fuel is the amount that would consume all of the available oxygen in the exhaust while being entirely converted to complete combustion products, which are $H_2O$ and $CO_2$. A stoichiometric amount corresponds to fuel-air equivalence ratio of 1.0. Doubling the fuel amount would give an equivalence ratio of 2.0. A fuel-exhaust mixture having an equivalence ratio less than one is a lean mixture. A fuel-exhaust mixture having an equivalence ratio greater than one is a rich mixture.

Diesel exhaust temperatures typically range from about 110 to about 550° C. The higher temperatures typically occur only during high-speed, high-load operation. Accordingly, it is usually necessary to heat the fuel reformer 105 above the exhaust stream temperature to steam reforming temperatures before operating the fuel reformer 105 to produce reformate.

The thermal mass 106 is an inert structure providing a heat sink. The thermal mass 106 helps protect downstream devices from the high temperatures at which the fuel reformer 105 operates, particularly when those temperatures are sustained only briefly. Preferably, the heat capacity of the thermal mass 106 is substantially greater than that of the fuel reformer 105. While any suitable structure can be used, a preferred structure for the thermal mass 106 is that of a monolith because monoliths can provide higher heat transfer coefficients in comparison to other structures for given space and back pressure limitations. While the thermal mass 106 can comprise any suitable material, a preferred material is metal because the high thermal conductivity of metal facilitates rapid dispersal of heat throughout the monolith structure.

The LNT 107 is a device that absorbs $NO_X$ under lean conditions and reduces $NO_X$ releasing the reduction products ($N_2$ and $NH_3$) under rich conditions. Some alternate terms for a lean $NO_X$ trap (LNT) are $NO_X$ absorber-catalyst and $NO_X$ trap-catalyst. An LNT generally comprises a $NO_X$ adsorbent and a precious metal catalyst in intimate contact on an inert support. Examples of $NO_X$ adsorbent materials include certain oxides, carbonates, and hydroxides of alkaline earth metals such as Mg, Ca, Sr, and Ba or alkali metals such as K or Cs. The precious metal typically comprises one or more of Pt, Pd, and Rh. The support is typically a monolith, although other support structures can be used. The monolith support is typically ceramic, although other materials such as metal and SiC are also suitable for LNT supports. The LNT 107 may be provided as two or more separate bricks.

Normally, the exhaust from the engine 101 is lean and the LNT 107 is accumulating $NO_X$. From time-to-time, the LNT 107 must be regenerated to remove the accumulated $NO_X$ (denitrated) in a rich phase. Denitration generally involves heating the reformer 105 to an operational temperature and then using the reformer 105 to produce reformate. The reformate fuels the reactions by which $NO_X$ adsorbed in the LNT 107 is reduced and then released.

Denitration requires only a few seconds. The thermal mass 106 prevents parts of the LNT 107 from being heated to the temperatures at which the fuel reformer 106 operates with each denitration. By reducing the frequency with which the LNT 107 is heated substantially and by increasing the uniformity with which the LNT 107 is heated, the thermal mass 106 extends the lifetime and reliability of the LNT 107.

The controller 115 schedules denitration of the LNT 107 based on criteria relating to the state and or performance of the exhaust aftertreatment system 103 or a portion thereof comprising the LNT 107. Criteria for scheduling LNT denitration may be based on LNT loading. LNT loading can be characterized in terms of amount of $NO_X$ accumulated, remaining $NO_X$ storage capacity, percent saturation, or another parameter of that type. Numerous methods for estimating $NO_X$ loading and/or remaining $NO_X$ storage capacity are available. These methods generally involve integrating an estimate of the $NO_X$ storage rate and comparing the result to an estimated $NO_X$ storage capacity.

In addition to storing $NO_X$, the LNT 107 absorbs and stores $SO_X$. From time to time, the LNT 107 must also be regenerated to remove accumulated sulfur compounds (desulfated). This process is required much less frequently than denitration, but takes considerably longer. Because the LNT 107 absorbs sulfur more strongly than $NO_X$, desulfation generally requires heating the LNT 107 in addition to providing a rich environment.

Desulfation generally involves heating the reformer 105 to an operational temperature, heating the LNT 107 to a desulfating temperature, and then using the reformer 105 to produce reformate. Reformate fuels the reactions by which $SO_X$ absorbed in the LNT 107 is released. Desulfating temperatures vary, but are typically in the range from about 500 to about 800° C., with optimal temperatures typically in the range of about 650 to about 750° C. If the temperature is too low, desulfation is very slow. If the temperature is too high, the LNT 107 may be damaged.

The controller 115 initiates and controls the denitration and desulfation processes, including the heating steps, primarily by operating the fuel injector 116. Optionally, the controller 115 may also be configured to alter the engine exhaust composition and or flow rate to facilitate regeneration. The controller 115 could be configured to actuate a throttle on the air intake for the engine 101. While throttling reduces the fuel required for regenerations and makes temperature control easier in the aftertreatment system 103, the alternative of configuring the exhaust aftertreatment system 103 to operate without affecting operation of the engine 101 also has advantages.

Generally, the controller 115 heats the fuel reformer 105 by injecting fuel into the exhaust at a rate that leaves the exhaust lean. If the fuel reformer 105 is at an operative temperature for oxidation, at least a portion of the injected fuel will combust in the fuel reformer 105, heating the fuel reformer 105. The exhaust is also heated and if the lean phase is prolonged the hot exhaust will heat downstream devices such as the DPF 108. The controller 115 generally produces rich conditions by increasing the fuel injection rate, although measures that reduce the exhaust oxygen flow rate (by reducing the exhaust oxygen concentration and or the exhaust flow rate) can be used instead of or in addition to increasing the fuel injection rate.

A pre-combustor can extend the operating temperature range for the fuel reformer 105. A pre-combustor is an optional catalytic device that can be configured upstream from the fuel reformer 105. A pre-combustor catalyzes combustion at temperatures below the light off temperature for the fuel reformer 105. Preferably, a pre-combustor comprises an oxidation catalyst and is designed to combust only a fraction of the injected fuel. Preferably, a pre-combustor vaporizes the portion of the fuel that it does not combust. Fuel vaporization contributes to the mixing of fuel with exhaust. Such mixing enhances the operation of the fuel reformer 105. A preferred pre-combustor design is a monolith having relatively large diameter passages and only a fraction of the passages coated with catalyst.

The DPF 108 is also an optional component, but one that is commonly included with the exhaust aftertreatment system 103. $NO_X$ and particulate matter are the principal pollutants of diesel engine exhaust. A diesel exhaust aftertreatment system generally requires a DPF to control particulate matter emissions in addition to some means for controlling $NO_X$ emissions.

A diesel particulate filter is a device that traps particulates, removing them from the exhaust flow. The DPF 108 can be a wall flow filter, which uses primarily cake filtration, or a pass through filter, which uses primarily depth filtration. Wall flow filters are more common. In a wall flow filter, the soot-containing exhaust is forced to pass through a porous medium. Typical pore diameters are from about 0.1 to about 1.0 μm. Soot particles are most commonly from about 10 to about 50 nm in diameter. In a fresh wall flow filter, the initial removal is by depth filtration, with soot becoming trapped within the porous structure. Quickly, however, the soot forms a continuous layer that becomes the primary means of filtration.

The DPF 108 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers.

The position of the DPF 108 within the exhaust system 103 is optional, but is preferably upstream from the Venturi 109. Between the fuel reformer 105 and the LNT 107, the DPF 108 can operate as the thermal mass 106. Placing the DPF 108 between the fuel reformer 105 and the ammonia-SCR reactor 110 helps protect the SCR catalyst 110 from high temperature conditions generated to desulfate the LNT 107.

Trapped soot can be removed from the DPF 108 continuously by catalyzing reactions between soot and $NO_X$, but to avoid excessive accumulation of soot and excessive back pressure on the exhaust flow the DPF 108 must typically be heated from time-to-time to a temperature at which the DPF 108 regenerates by combustion of trapped soot under lean exhaust conditions. The temperature required for soot combustion can be reduced by a catalyst. Suitable catalysts include precious metals and oxides of Ce, Zr, La, Y, and Nd. Soot combustion is exothermic and is generally self-sustaining once ignited.

The Venturi 109 is formed in the exhaust line 104. The exhaust line 104 comprises conduits for the exhaust, typically including exhaust pipes. Exhaust pipes have standard sizes for medium and heavy duty vehicles that form the principle application for the present invention. A typical exhaust pipe size is 5.0 inch (12.7 cm) diameter. Alternatively, the Venturi 109 can be formed into an exit cone or other exit region of the DPF 108 or an entrance cone or other entrance region of the ammonia-SCR reactor 110. While the examples provide alternatives, the Venturi 109 is typically designed to constrict an exhaust flow received from a standard exhaust pipe and to expand the diluted flow into another pipe of standard size.

A Venturi is a device that reduces the pressure of a flowing gas by forcing the flow through a constriction. Within the constriction, the neck region 112 of the Venturi 109, the reduced pressure draws air from the surroundings into the exhaust line 104 through air intake 114. The air mixes with the exhaust increasing the exhaust oxygen content and reducing the exhaust temperature. The Venturi 114 is generic and can have any suitable structure, including a structure corresponding to any one of the exemplary Venturi described herein.

The ammonia-SCR reactor 110 is a catalyst effective to catalyze reactions between $NO_X$ and $NH_3$ to reduce $NO_X$ to $N_2$ in lean exhaust. Examples of SCR catalysts include oxides of metals such as Cu, Zn, V, Cr, Al, Ti, Mn, Co, Fe, Ni, Rd, Mo, W, and Ce and zeolites, such as ZSM-5 or ZSM-11. Preferred SCR catalysts include, without limitation, iron-exchanged zeolites, copper-exchanged zeolites, and vanadium oxide. The ammonia-SCR reactor 110 adsorbs and stores ammonia generated by the LNT 107 during denitration. The ammonia-SCR reactor 110 uses the stored ammonia to reduce NO that slips from the LNT 107. This improves the $NO_X$ mitigation performance of the exhaust aftertreatment system 103 in comparison to one having only the LNT 107 for $NO_X$ mitigation.

The ammonia-SCR reactor 110 allows the time between denitrations and the time between desulfations of the LNT 107 to be extended. Denitration of the LNT 107 may be delayed until the stored ammonia has been substantially consumed. Desulfation of the LNT 107 may be postponed until the combined performance of the LNT 107 and the SCR catalyst 110 has become inadequate.

It has been observed that in the absence of the Venturi 109 the effectiveness of the ammonia-SCR reactor 110 is diminished during periods immediately following regeneration of the LNT 107, even when regeneration has replenished the reactor's ammonia supply. This observation was determined to be the result of poisoning of the ammonia-SCR reactor 110 by hydrocarbons. The poisoning reverses itself over time as the hydrocarbons become oxidized, but the poisoning delays utilization of ammonia generated by the LNT 107. Some of the ammonia is lost during the delay period. If not used quickly enough, ammonia held by the ammonia-SCR reactor 110 is oxidized to NO and released rather than consumed reducing $NO_X$.

The Venturi 109 is functional to reduce poisoning of the ammonia-SCR reactor 110 by hydrocarbons and thereby reduces the delay in ammonia use and resulting waste of ammonia. Air drawn by the Venturi 109 provides oxygen that consumes hydrocarbons by combustion before they poison the ammonia-SCR reactor 110. In a lean environment, the ammonia-SCR reactor 110 is effective to catalyze such combustion. The Venturi 109 can maintain lean conditions for the ammonia-SCR reactor 110 even as the LNT 107 is being regenerated under rich conditions.

Hydrocarbon combustion should not be allowed to heat the ammonia-SCR reactor 110 to an excessive temperature. For a typical SCR catalyst 625° C. could be excessive while 550° C. is not. If the temperature of the ammonia-SCR reactor 110 is allowed to reach an excessive level, the catalyst undergoes irreversible deactivation. Heat generated by combustion is offset by the cooling effect of drawing air into the exhaust. By drawing sufficient air into the exhaust and optionally also regulating the hydrocarbon content of the exhaust during regeneration, the net effect can be made one of little or no heating and even one of cooling. A cooling effect is particularly advantageous during desulfation of the LNT 107 or high temperature regeneration of the DPF 108. The amount of hydrocarbon in the exhaust is preferably kept low to minimize the amount of excess air required, but there are practical limits on the extent to which the hydrocarbon content of the exhaust can be reduced.

For desulfation, the controller 115 preferably operates the fuel injector 116 such that the fuel reformer 105 consumes excess oxygen within the exhaust and provides the exhaust with a hydrocarbon and reformate content between 1% and 6%, typically 2%-4%. Numbers are time averaged for the ubiquitous pulsations in internal combustion engine exhaust flow. About half the total hydrocarbon and reformate is consumed by the LNT 107 and the remaining half reaches the ammonia-SCR reactor 110. The preferred fuel injection rate provides an acceptable rate of desulfation while keeping the rate of hydrocarbon slip from the LNT 107 to the ammonia-SCR reactor 110 within acceptable limits. Most of the excess hydrocarbon is combusted within the ammonia-SCR reactor 110 using oxygen drawn by the Venturi 109.

The amount of air drawn by the Venturi 109 depends on the exhaust flow rate which in turn depends on the speed of the engine 101. For effective mitigation of hydrocarbon poisoning in the ammonia-SCR reactor 110, the Venturi 109 preferably draws enough air to dilute the exhaust by at least 5% when the engine 101 is running at its peak torque speed. More preferably the Venturi 109 draws at least 10% air at this condition and still more preferably at least 20% air. With a 20% air draw, the Venturi 109 effectively mitigates hydrocarbon poisoning of the ammonia-SCR reactor 110 and cools the ammonia-SCR reactor 110 during regeneration events provided the reductant is supplied to the exhaust at the preferred rates for desulfation of the LNT 107.

The Venturi 109 is sized to provide a sufficiently low pressure for drawing the desired amount of air after taking into account head loses from the neck zone 112 to the exhaust outlet. Significant factors include friction loses in the expansion zone 113, friction loses to the ammonia-SCR reactor 110, and friction loses exhaust system components downstream from the SCR catalyst 110.

The pressure reduction of a Venturi follows from Bernoulli's principle. Bernoulli's principle states the pressure of a flow will decrease in relation to the flow speed. The decrease is roughly proportional to the density of the fluid multiplied by the flow speed squared. More exact formula are readily available as are tables and tools for computing the desired cross-sectional area for the neck based on the target pressure reduction. Typically, the Venturi 109 will be sized to provide a pressure reduction of at least 5 kPa, more typically from 10 to 30 kPa, when the engine 101 is at its peak torque speed. An exemplary design target is a 20 kPa reduction.

The cross-sectional area of the neck 112 that achieves the target pressure reduction depends on the volumetric flow rate of the exhaust. The flow rate at the peak torque speed is generally suitable for design purposes and is the one referred to in the examples. Typical flow rates for a medium duty power generation system are from about 150 to about 900 kg/hr, typically from about 300 to 600 kg/hr. Heavy duty systems have higher flow rate ranges.

For a given flow rate, there is a cross-sectional area at which the Mach number is one. The Mach number is the ratio between the flow speed and the speed of sound under the prevailing conditions. For a typical exhaust composition at 300° C., the speed of sound is approximately 480 m/s. The speed of sound varies approximately as the square root of absolute temperature. Tables and formula typically give the cross-sectional area of the neck that gives a target pressure reduction as a ratio to the cross-sectional area at which the Mach number is one.

The neck typically raises the Mach number to at least 0.2, commonly at least 0.3, and even 0.5. These are much higher Mach numbers than are typical for downstream Venturi that do not need to overcome the back pressure created by a device such as the ammonia-SCR reactor 110. For a pressure reduction of 20 kPa the area of the neck must be approximately twice the area at which the Mach number would be one (providing mach 0.5). For a 300 kg/hr flow rate at 300° C., which is typical for a 5" diameter exhaust pipe, the neck area that achieves mach 0.5 is approximately 0.0012 $m^2$ (roughly corresponding to a 1.5" pipe diameter). The neck can be made narrower if the resulting back pressure is not excessive, but in no case should the neck be made so narrow as to raise the Mach number to 1.0 or greater. For typical medium and heavy duty diesel truck applications, the requirements make the preferred neck area in the range from about 0.0005 $m^2$ to 0.0025 $m^2$.

Sudden contractions and expansion can cause large friction losses in exhaust flows. Such losses can be greatly reduced by making the increases and decreases in flow area gradual. For example, limiting the taper within the expansion zone of a duct (exhaust pipe) to an angle less than about 8° avoids boundary layer separation and greatly reduces irreversible head losses due to flow through the expansion zone. Where a very gradual taper is not practical, guide vanes can be used to reduce friction loses.

Friction losses caused by pipe bends, sudden expansions, and sudden contractions, can all be reduced using guide vanes, typically by 50% or more. Space is often at a premium within exhaust aftertreatment systems and the advantages of compact designs weigh against the advantages of gradual taper. Where momentum drives the flow toward concentrating in one part of a duct, guide vanes can be used to more uniformly distribute the flow. The advantages of guide vanes must be balanced against the friction loses they cause. The examples that follow do not illustrate guide vanes, but can be modified to include guide vanes with the shape number and location being best determined using a combination of intuition, flow simulation, and experimentation.

Venturi Integrated with a Pipe Bend

A separate concept, with broader application, is a Venturi 109 in which the constriction zone 111 and/or the air inlets 114 are integrate into the bend of a pipe or other conduit. A bend is a portion of a conduit over which the direction of the channeled flow, averaged through complete cross-sections of the flow, changes. FIGS. 2-8 illustrate Venturi following this concept.

Figure 5:
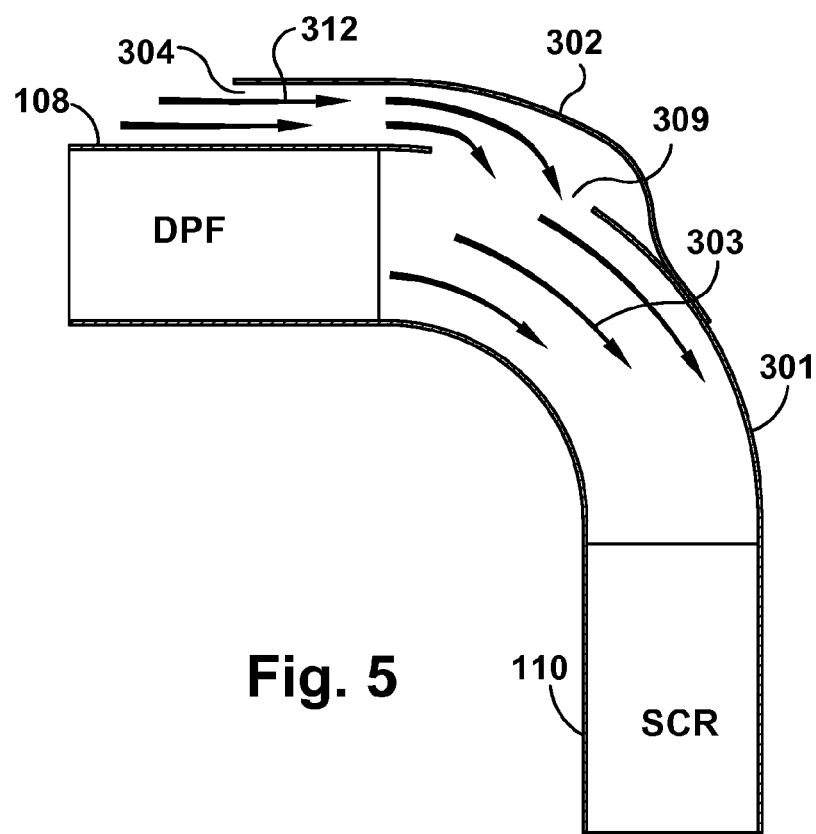
FIG. 5 is an illustration of a portion of an exemplary exhaust aftertreatment system.

Packaging considerations often motivate the placement of pipe bend between the DPF 108 and the ammonia-SCR reactor 110 as illustrated by FIG. 5. Within the pipe bend 301, the momentum of the flow 303 concentrates the exhaust on the outer portion of the bend 301. The purpose of the constriction zone 111 is to concentrate and thereby accelerate the exhaust flow. By restricting the exhaust flow 303 to narrow toward the outer portion of a pipe bend 301, the back pressure created by the pipe bend 301 can be largely subsumed into the back pressure required to constrict the flow into the Venturi neck 112.

Even without a flow restriction, the concentration of a turbulent flow on the outer portion of a pipe bend necessitates flow acceleration. A turbulent flow is by definition one in which momentum forces influence the flow distribution to a greater extent than viscous forces. By Bernoulli's principle, the pressure in the outer portion of the bend 301 will be reduced. Accordingly, arranging an air inlet 309 within the region of reduced pressure can provide a Venturi even without a physical constriction of the flow. The air inlet 309 should be configured in such a manner that the momentum of the exhaust does not carry the exhaust out the inlet 309.

A constriction preserves the accelerated flow condition beyond the pipe bend. Without a constriction, the flow will expand downstream from the pipe bend away from the side of the pipe on which the flow has become concentrated. With a constriction, the region in which flow is accelerated and its pressure reduced is extended. A constriction can also enhance the degree of flow concentration and acceleration. The air intake 114 can be placed in the pipe bend 301 or downstream from the pipe bend 301, but the later location would generally not benefit from the pipe bend unless the cross-sectional area available for the flow is reduced through the pipe bend 301.

Figure 2:
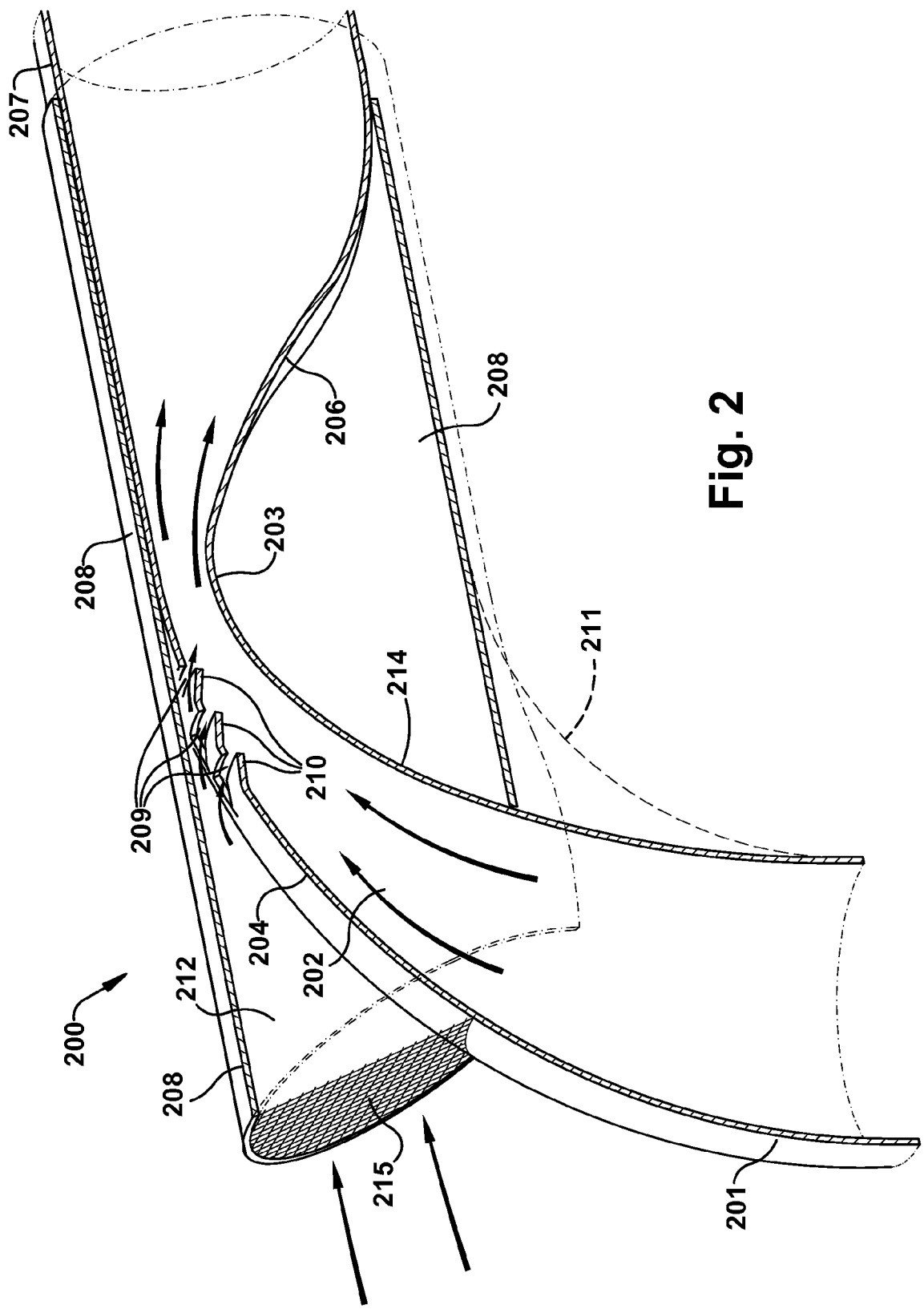
FIG. 2 is a cut-away view of one example of a Venturi formed into a pipe bend.
Figures 3, 4:
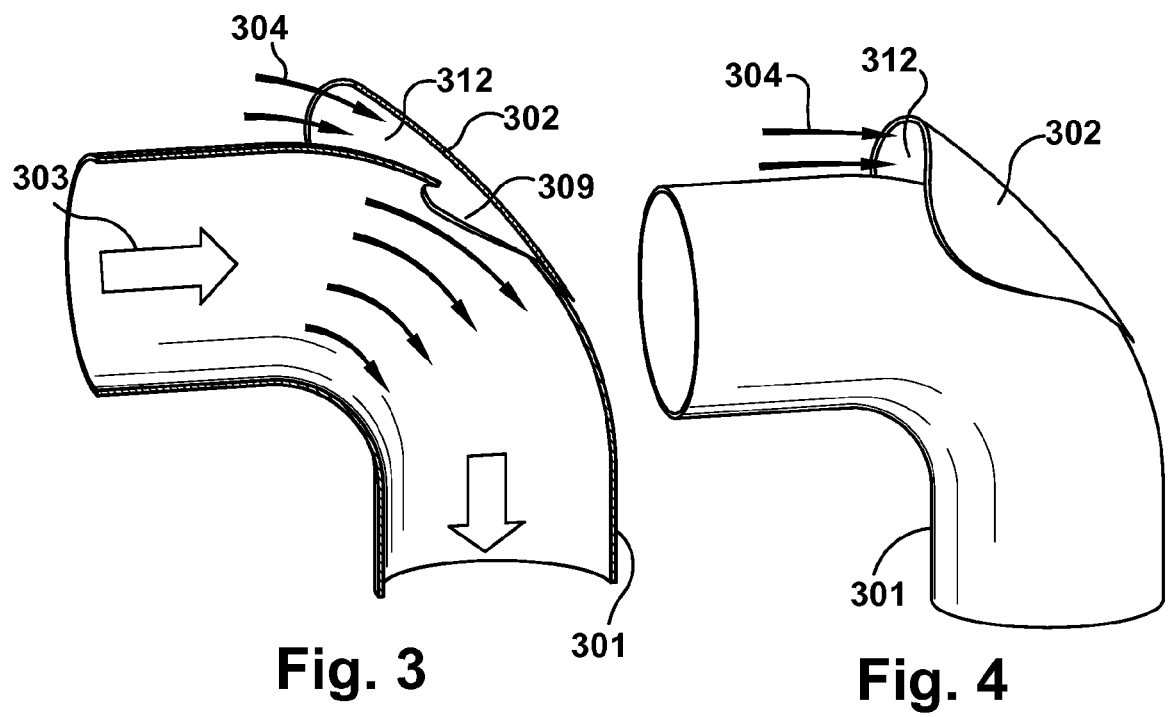
FIG. 3 is a cut-away view of another exemplary Venturi formed into a pipe bend.
FIG. 4 is a full view of the Venturi of FIG. 3.

FIG. 2 illustrates an exemplary Venturi 200 that is formed into a bend 201 of a pipe 207. The Venturi 200 comprises a constriction zone 214 through which the mean flow direction changes and the area available for flow 202 narrows, a neck zone 203 through which the flow 202 is most tightly constricted, and an expansion zone 206. The outer wall 204 of the pipe bend 201 has the shape that would be expected for a 90° pipe bend having an outer radius twice its inner radius. The flow is constricted by shifting the inner wall 214 from location 211, which would be the inner wall location if the bend 201 did not constrict the flow.

The air intake for the Venturi 200 comprises openings 209 formed in the outer wall 204 of the pipe bend 201. These openings are formed by cutting and bending tabs 210 in the wall 204. The tabs 210 bend into the exhaust flow and divert the flow away from the openings 209. Comparatively high pressure regions form behind the tabs 210, with the result that air flows from these regions into the low pressure exhaust racing past the tabs 210. Air is drawn from an air intake manifold 212 through the openings 209 and into the pipe 207.

Exhaust Sleeve and Ram Air Intake

Another concept illustrated by FIG. 2 is an air intake manifold formed by a sleeve that fits over an exhaust pipe. The intake manifold 212 is formed by a sleeve 208 that is shaped to slide over the exhaust pipe 207 downstream from the bend 201. A screen 215 filters the air flowing into the manifold 212. The sleeve 208 can be used to gather air and increase the draw of the Venturi 200.

Another concept is to use the flow of air past a vehicle, ram air, to enhance the intake of a Venturi. This concept is further illustrated by FIGS. 3-5. In these figures, a sleeve 302 gathers ram air into an intake manifold 312. From the intake manifold 312, the air is drawn through Venturi openings 309 formed in a pipe bend 301. Within the pipe 301, the air mixes with exhaust 303. Ram air 304 is air driven into the entrance of the manifold 312 by the normal forward movement of a vehicle on which is mounted the exhaust aftertreatment system employing the Venturi. The ram intake concept can be employed without a pipe bend, but the pipe bend facilitates a wide sweep for the ram intake, as best illustrated with sleeve 208 of FIG. 2. As an alternative, or in addition, forced convection into a Venturi air inlet manifold can be produced by a fan. The lack of an energy requirement or moving parts is the particular advantage of the air intake manifold configuration providing vehicle motion induced ram assisted Venturi air intake.

Intake Diffuser

For the benefit of air dilution by the Venturi 109 to be fully realized, the drawn air must effectively mix with the exhaust prior to reaching the catalyst of the ammonia-SCR device 110. If the intake air joins the exhaust flow exclusively at the flow perimeter, it may remain concentrated at the perimeter through the flow expansion in the zone 113.

One concept for achieving a well mixed flow is to configure the Venturi air intake 114 to admit air into the exhaust flow at distributed locations. This can be achieved by extending the intake manifold to intrude the exhaust flow area and admit the air into the exhaust through a plurality of small opening formed in the manifold. The plurality of openings are preferably spread evenly with respect to the exhaust flow.

Figure 6:
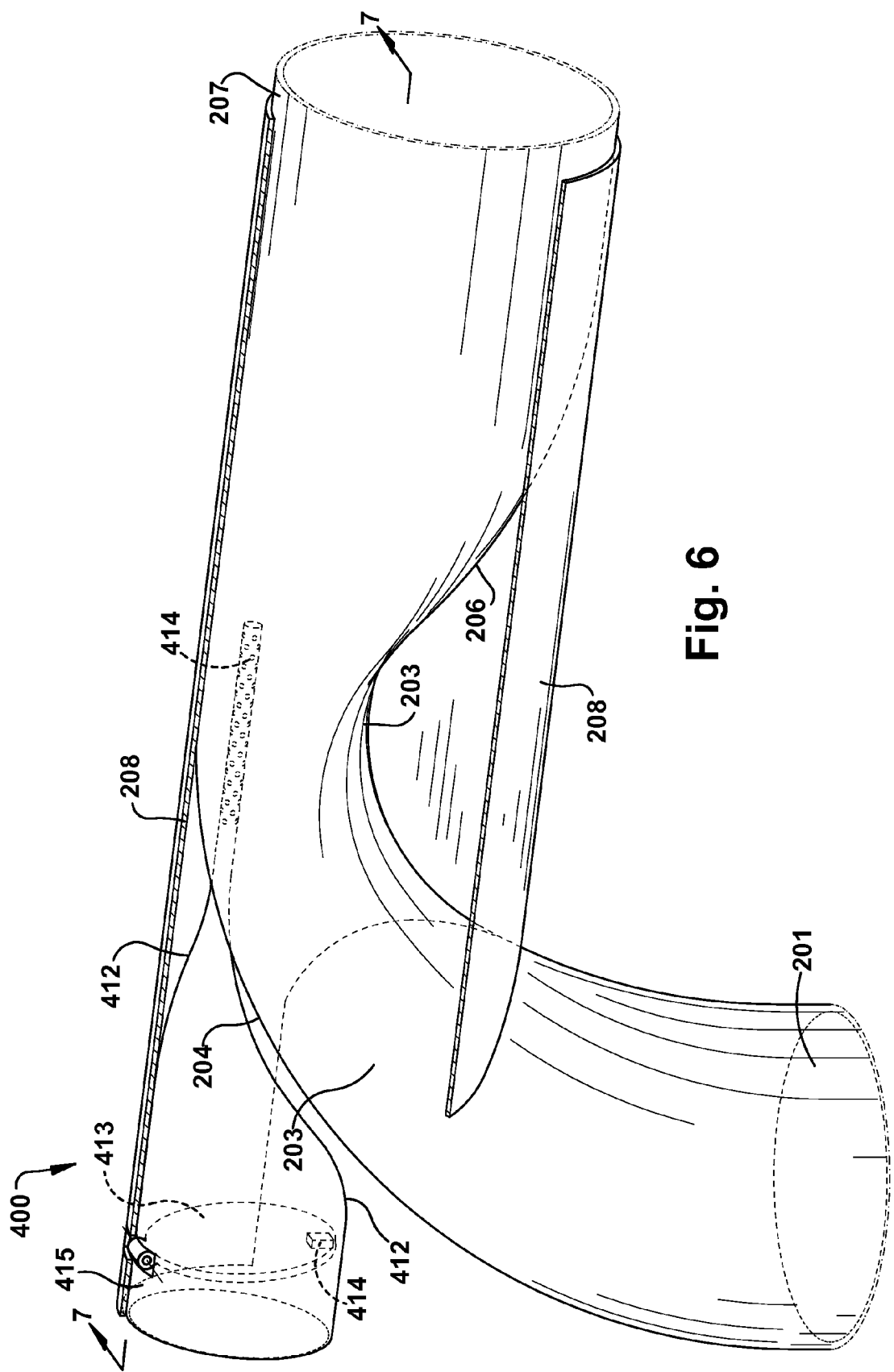
FIG. 6 is a cut-away view of still another exemplary Venturi formed into a pipe bend.
Figure 7:
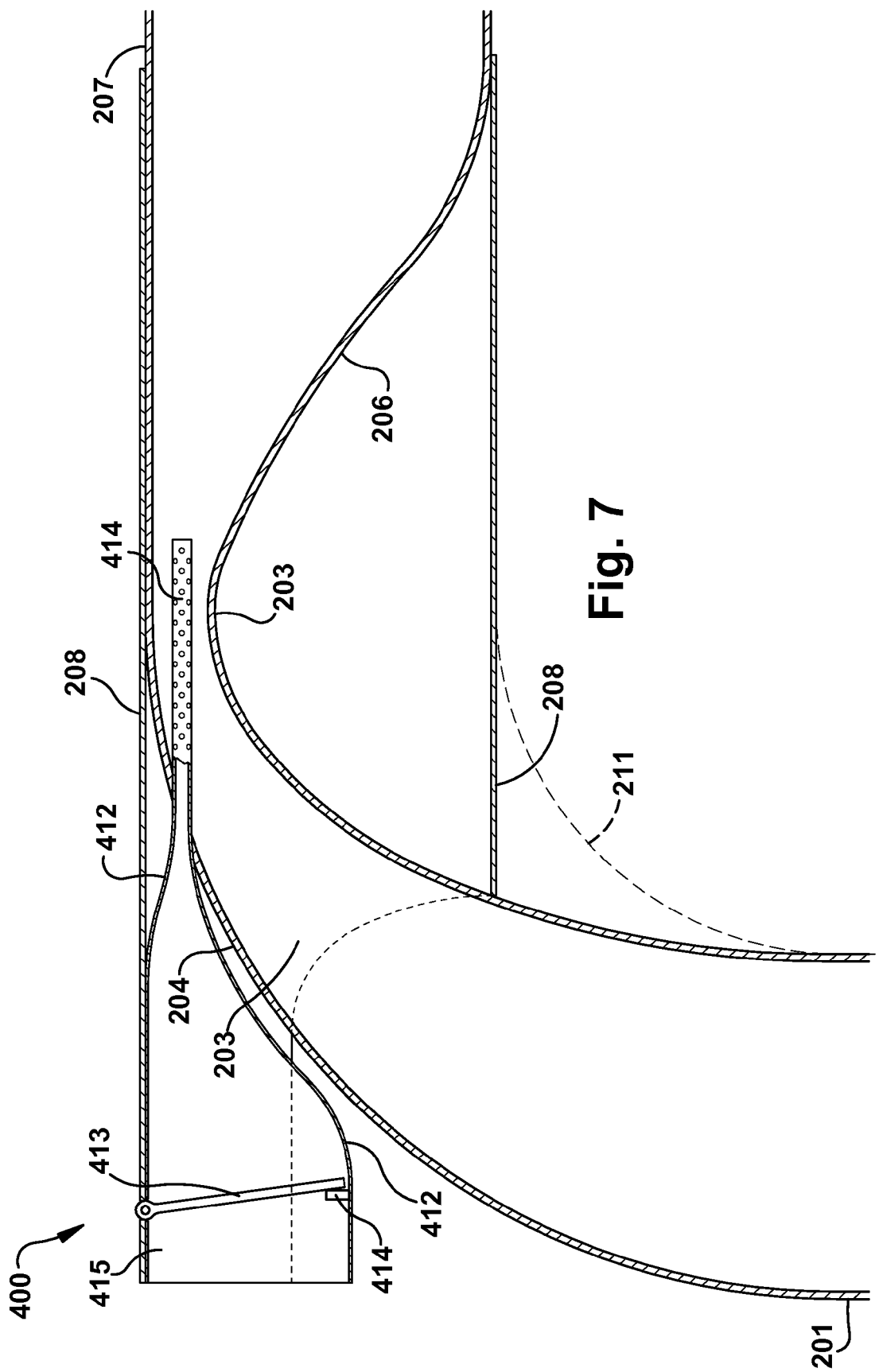
FIG. 7 is another cut-away view of the Venturi of FIG. 6.
Figure 8:
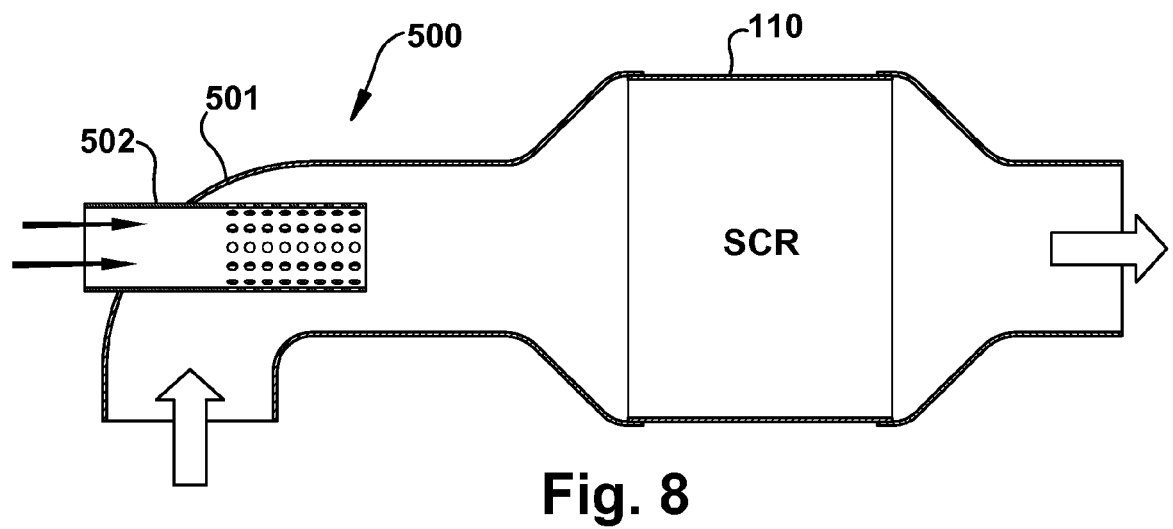
FIG. 8 is an illustration of a portion of another exemplary exhaust aftertreatment system.

FIGS. 6 and 7 illustrate an exemplary Venturi 400 similar in many respects to the Venturi 200, but including a diffuser pipe 414 that intrudes the exhaust flow area and admits air into the exhaust through a plurality of small openings formed about the diffuser pipe 404's perimeter. The shape of the diffuser pipe 414 and the distribution of its openings are similar to that shown in FIG. 8 with the diffuser pipe 502. The diffuser pipe 502 intrudes a pipe bend 501 of a Venturi 500. The manifold 412, which requires an additional piece 415 to the pipe sleeve 208, channels the air into the diffuser pipe 414. The diffuser pipe 414 has openings distributed over a large number of radii and also over an extended axial length. The diffuser 414 can take on complex shapes that introduce air into the exhaust in a still more evenly distributed manner, but friction losses and resulting back pressure militate against excessively disrupting the exhaust flow within the neck region 112 with intruding passages.

Intake Check Valve

Another feature of the Venturi 400 is a hinged door 413 that provides a check valve for intake air. While the preferred embodiments generally avoid moving parts, a check valve for intake air can be desirable to prevent backflow of exhaust out the Venturi air intake 114. The door 413 is biased to a closed position in which the door seals against the stop 414 to close off the manifold 412 from the external environment. The door 414 is configured to open only when the pressure differential across the door 413 is great enough and in the direction that causes air to enter the Venturi 400.

Figure 9:
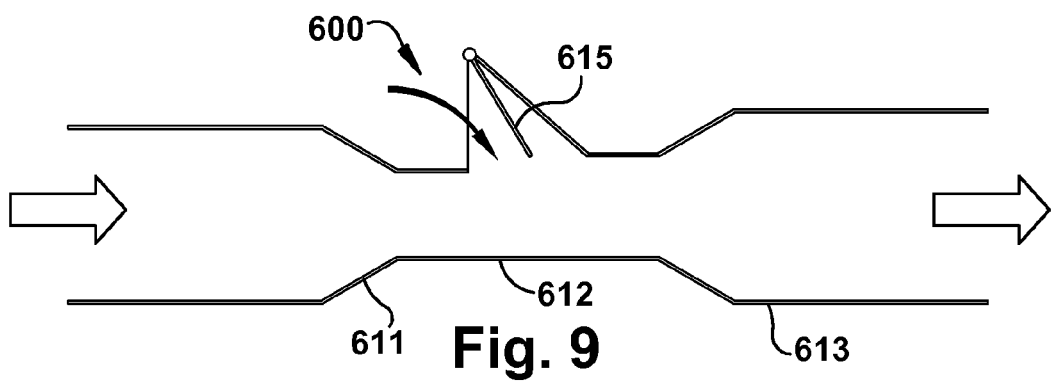
FIG. 9 is a sketch of an exemplary Venturi with a hinged opening to prevent backflow.
Figure 10:
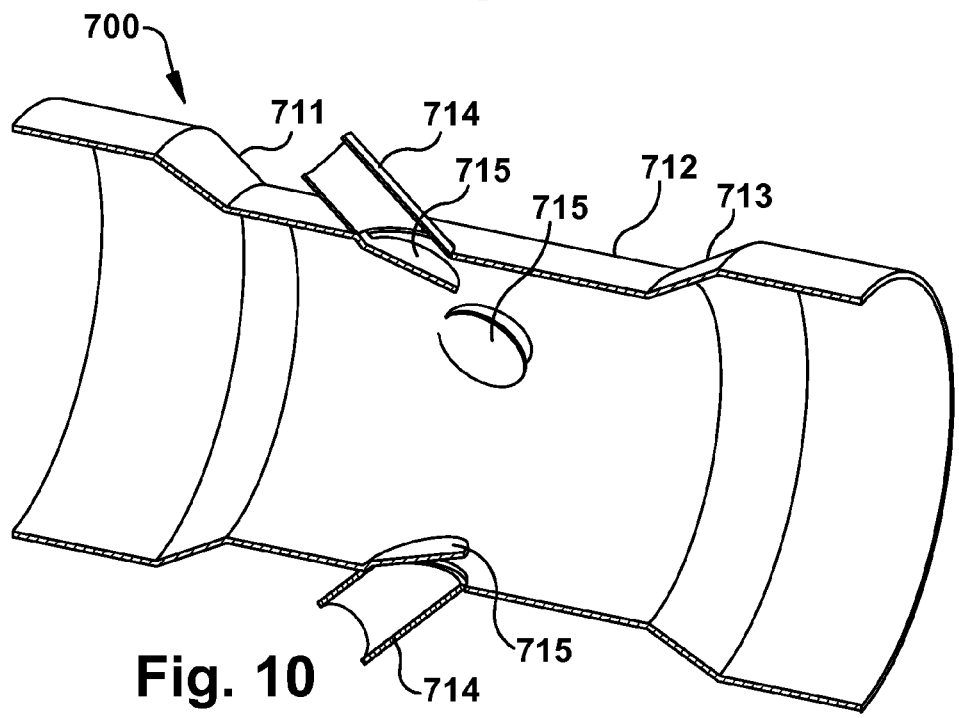
FIG. 10 is a cut-away view of another Venturi with hinged openings to prevent backflow.

A biasing force for a Venturi air inlet can be created in any suitable manner. Examples of potentially suitable means include a spring that biases the door 413 closed, a configuration where gravity tends to hold the door 413 closed, and a magnet that draws the door 413 closed. FIG. 9 illustrates a Venturi 600 in which gravity biases to a closed position a door 615 that blocks exhaust from the Venturi neck 612 from escaping the exhaust line. The door 413 can be replaced by a plurality of doors that collectively close the intake 114. The doors can be placed at any suitable location through the intake 114. FIG. 10 illustrates an exemplary Venturi 700 in which a plurality of spring-biased hinged plates 715 actuate to seal off air intakes 714 where they join the Venturi neck 712.

Cyclonic Air Filtration

Another concept is to prevent foreign manner from entering the exhaust line through the Venturi using cyclonic filtration. Foreign matter could clog air intake passages or damage the ammonia-SCR reactor 110. FIG. 11 illustrates a Venturi 800 employing cyclonic air filtration. Cyclonic air filtration is achieved by imparting a rotation to the intake air flow. Centrifugal force drives particles away from the axis of rotation. Accordingly, the Venturi air is drawn from the flow area nearest the axis of rotation and thus away from the particulates.

The Venturi 800 comprises a contraction zone 811, a neck zone 812, and an expansion zone 813. A sleeve 818 held on mounts 819 forms intake manifold 817. Air enters the manifold through openings 815, preferably with a ram or fan flow assist. The intake air passes through vanes 816, guided entryways, or the like that impart a rotation to the entering flow about the axis of Venturi 800. From this rotating flow, air is drawn through openings 814, which are as close to the axis of air rotation as any part of the intake manifold 817. Particulates in the air are driven to the outer shell 818. The outer shell 818 may contain openings 820 to release the particles.

Venturi Formed into an SCR Entrance

Another concept is to form the Venturi 109 into the entrance region of the ammonia-SCR reactor 110. The advantages of this design include space savings and the possibility of utilizing an expanding exhaust system cross-section to facilitate ram assisted air intake. If ammonia-SCR reactor 110 is connected to upstream devices with a standard exhaust pipe, the open area around the comparatively narrow region upstream from the ammonia-SCR reactor 110 facilitates the flow of air into the opening of a Venturi formed into the entrance cone.

Figure 13:
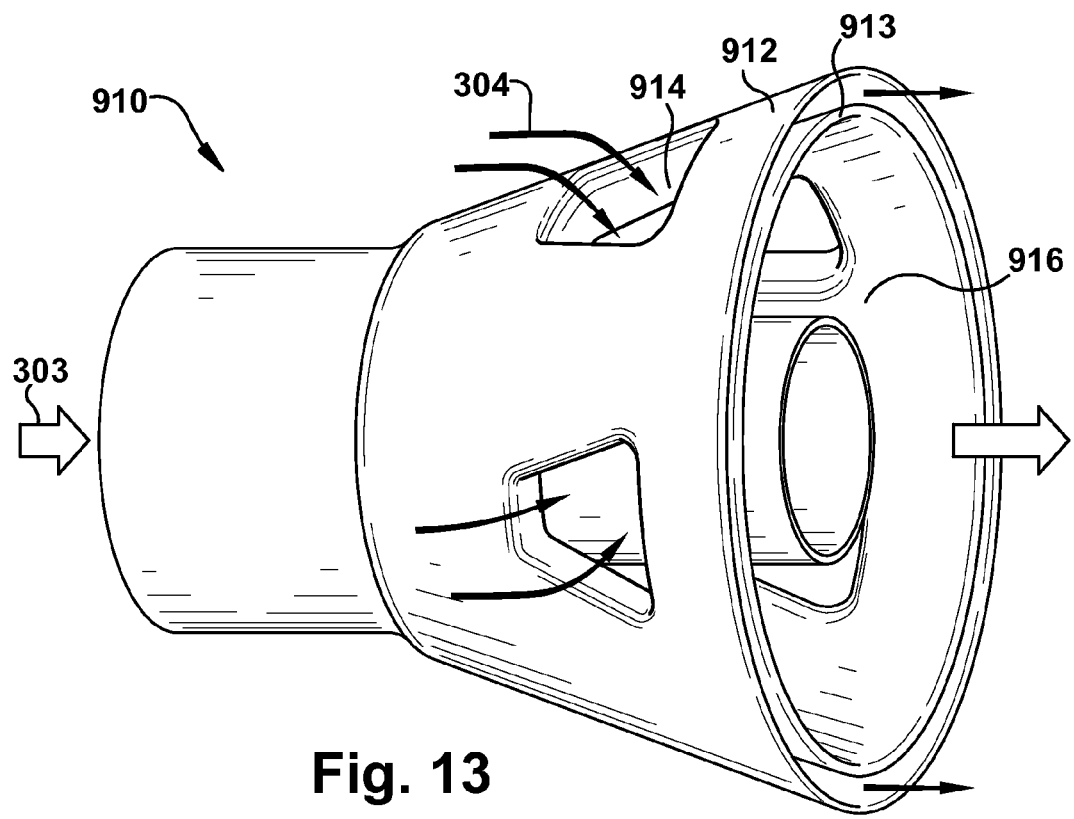
FIG. 13 is an illustration of another exemplary Venturi formed in the entrance cone for an SCR reactor.
Figure 14:
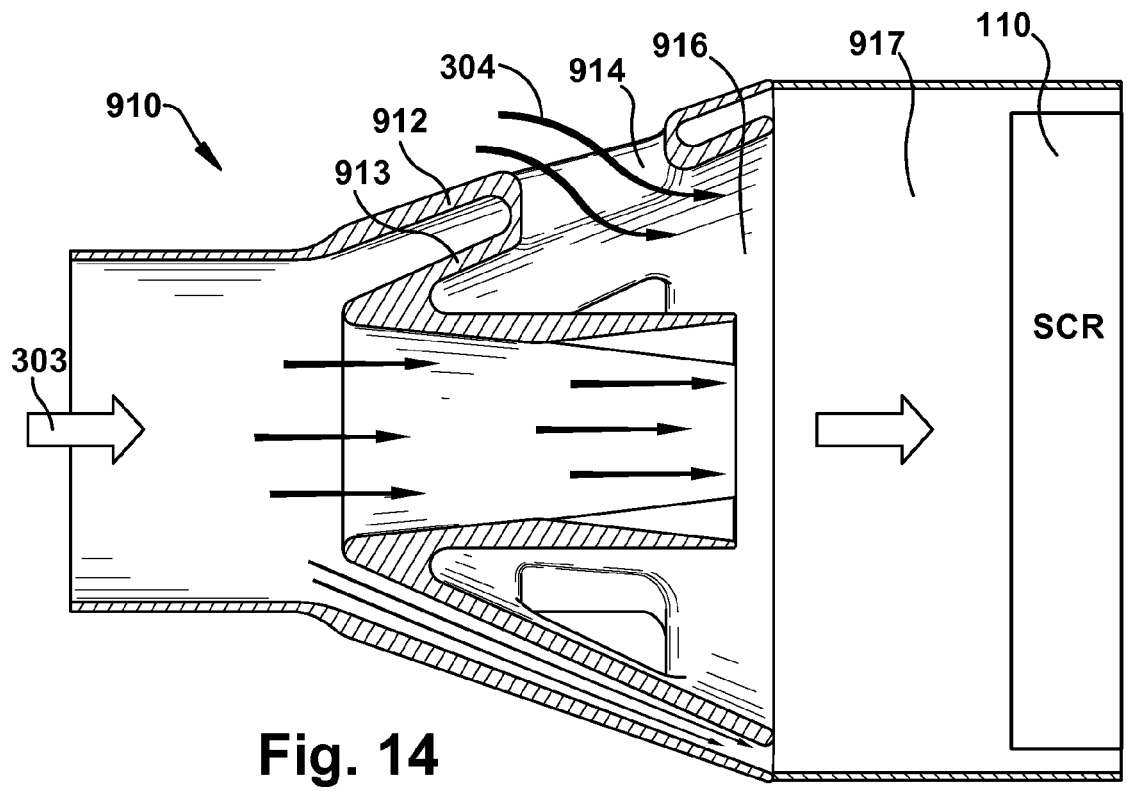
FIG. 14 is a cut-away view of the Venturi of FIG. 13.
Figure 17:
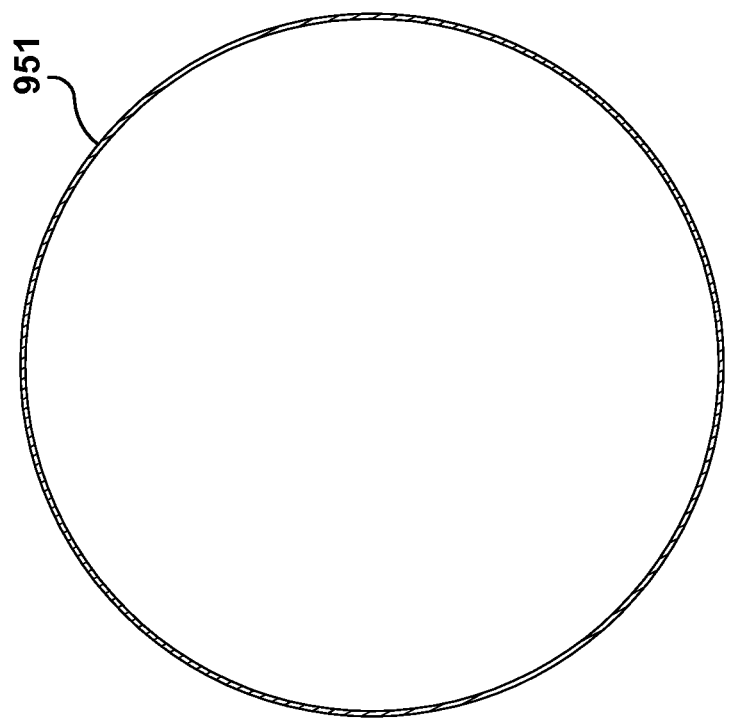
FIG. 17 is a cross-section of the Venturi of FIG. 15 taken along the line 17-17.

FIGS. 12-14 illustrate Venturi formed into the entrance cones of SCR reactors. The Venturi 900 comprises a structure 903 that narrows the exhaust flow from pipe 901 into an annular region of expanding radii formed by the structure 903 and the entrance cone 902 and a tubular region formed entirely by the structure 903. The Venturi 910 has substantially the same structure, but different dimensions.

The Venturi 900 comprises opening 904 in the entrance cone 902 and through the corresponding annular region. These openings admit ambient air into an intake manifold 906. Air from the intake manifold 906 joins the exhaust in the region 903. A mixing zone 905, optionally including guide vanes that facilitate mixing, is provided in the region 907 between the entrance cone 902 and the catalyst of the ammonia-SCR reactor 110. The Venturi 910 has a similar structure, which may be more easily appreciated through the illustrations of FIGS. 13 and 14.

Distributed Neck Flow

FIGS. 12-14 illustrate another concept, which is distributing the exhaust flow through the neck region by spatially spreading the flow area provided by the neck. The Venturi 200 and 400 restrict the neck flow to a substantially cylindrical shape. The Venturi 900 illustrates that the neck flow can be constricted without confining the flow to a small area. In the Venturi 900, the annular region can have an arbitrarily large diameter, provided the difference between the inner and outer radii of the annulus suitably limits the cross-sectional area of the annulus. The flow can be distributed through any number of conduit structures having any suitable cross-section. The principle limitations are manufacturing considerations and back pressure.

Normally, the friction induced by the neck 112 is not the principle source of Venturi back-pressure. Typically, the principle sources of back-pressure are from constricting the flow into and expanding the flow out of the neck 112. Where a high degree of flow dilution is required, another significant contribution to the back pressure is from forces associated with accelerating the intake air. However, as the surface area of the neck increases, friction from the neck itself will eventually become an important factor.

Aside from the length of the neck region 112, an important parameter correlating with the magnitude of friction losses in the neck area is the hydraulic diameter of the neck. The hydraulic diameter is the diameter of a tube having the same perimeter to cross-sectional area ratio (surface area to volume ratio for a short section) as the neck. For example, the hydraulic diameter for the neck region of the Venturi 900 will be much less than the minimum diameter of the neck 203 for Venturi sized to accommodate equivalent exhaust flows.

One advantage of distributing the exhaust flow with a non-circular cross-section neck region is facilitating a uniform distribution of air intake into the exhaust flow. Previously, an intake air manifold was described for improving the distribution of air intake through the exhaust volume. Instead of, or in addition to an air intake manifold, a convoluted neck flow region can be used. The comparatively large surface area of a convoluted neck admits a wider distribution of air intake openings resulting in more intimate contact between Venturi air and exhaust even before the flows have had time to mix. The convolutions preferably reduce the hydraulic diameter of the neck region by at least a factor of four in comparison with a neck of circular cross section. A factor of four represents a very substantial increase in the flow perimeter.

FIGS. 15-18 illustrate a Venturi 950 that uses a lobed conduit 960 to provide a high surface area in a neck region 954. The Venturi 950 comprises a constriction zone 952, a neck zone 953 without openings for air intake, a neck zone 954 having openings to admit ambient air, and an expansion zone 955. In the region 951 upstream from the Venturi 950 and in the region 956 downstream from the Venturi 950, the exhaust line 104 has the circular profile illustrated in FIG. 17. Within the constriction zone 952, the exhaust line cross-section smoothly transitions to the shape 960 illustrated in FIG. 16. The shape 960 forces the exhaust 964 through a space 961 comprising eight lob-shaped protrusions. The profiles 951 and 960 are shown using the same scale for FIGS. 17 and 18. Accordingly, it can be seen that the flow area 961 is greatly less than that defined by passage 951 and that the flow will accordingly be accelerated and brought to a reduced pressure within the neck regions 953 and 954. Within the expansion zone 955, the exhaust line cross-section smoothly transitions back to its original circular shape.

Heat Transfer Using the Neck Region

Another concept is to systematically remove heat from the exhaust in the neck region of a Venturi. Removing heat from exhaust requires overcoming a series of resistances. Those resistances include transfer of heat from the exhaust to a pipe wall, heat transfer through the pipe wall, and heat transfer away from the pipe wall, with the first and last being the most significant. A Venturi neck, particularly one having a convoluted cross-section, provides an excellent opportunity to carry out this heat transfer.

Figure 18:
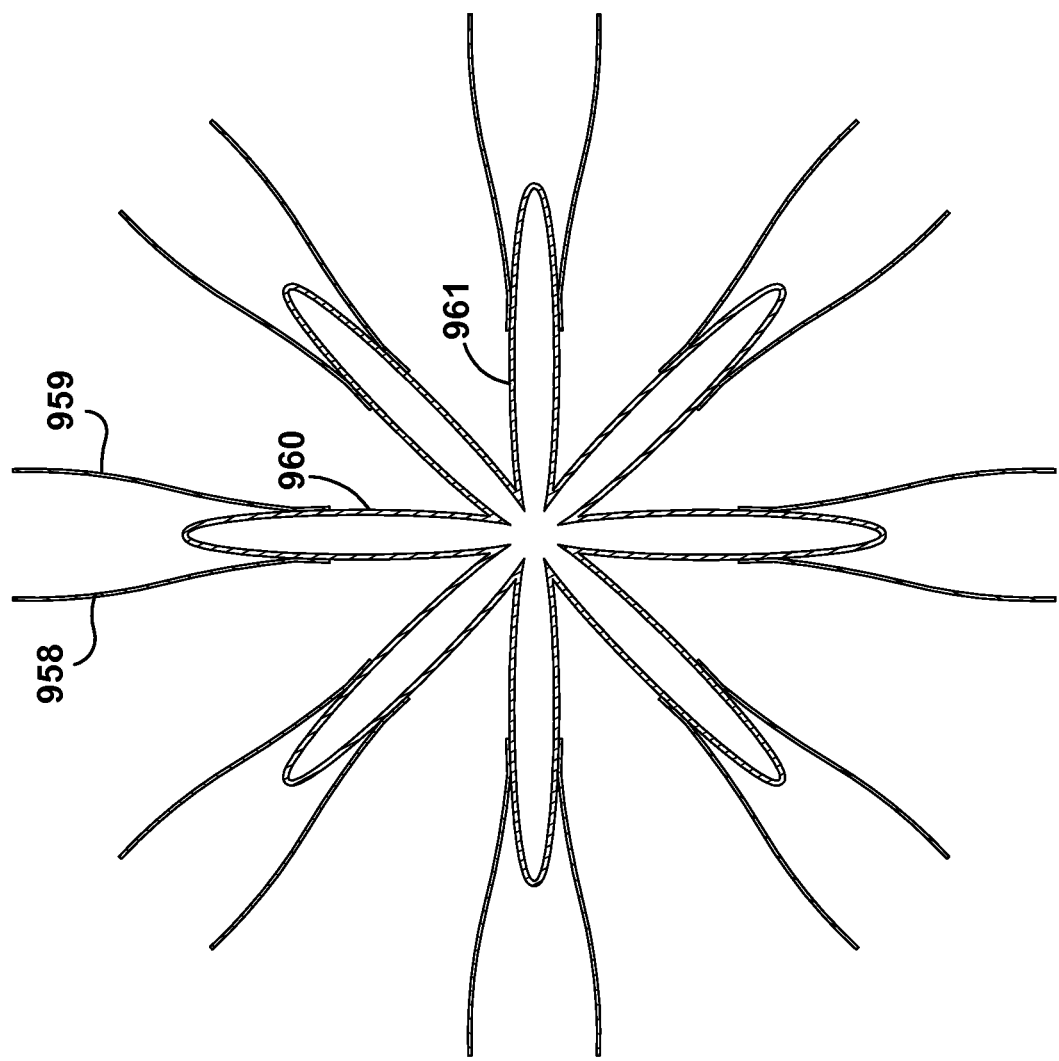
FIG. 18 is a cross-section of the Venturi of FIG. 15 taken along the line 18-18.

FIGS. 15-18 illustrate a Venturi 950 configured to transfer heat from the exhaust line 104 to the ambient. The Venturi 950 comprises neck regions 953 and 954 with the cross section 960 illustrated by FIG. 18. As can be seen by comparing FIGS. 17 and 18 transition to the neck region 953 greatly reduces the mean distance between flowing exhaust and the conduit wall. Within the neck region 953, each portion of the exhaust is very near a wall in comparison with the conventional state shown in FIG. 17. This greatly enhances the rate of heat transfer to the wall. The wall surface area is also increased, which makes for even faster heat transfer across the wall. More importantly, the shape 960 greatly increases the contact area between the conduit wall and ambient air when compared to the circular tube 951. To provide a substantially increased heat transfer rate in comparison with an equivalent length of ordinary exhaust pipe, the hydraulic diameter within the neck region 112 is preferably at least ten times less than that of adjacent pipe and the surface area per unit length (perimeter) is preferably at least two times greater. The eight lobs of FIG. 18 provide approximately 2.5 times the perimeter of the straight pipe of FIG. 17.

Heat loss from to the ambient can be further enhances with heat radiating vanes attached to the neck region. In this example, heat radiating vanes 959 are provided. Heat transfer from the exhaust to the external environment is particularly desirable during desulfation of the LNT 107 and when soot is combusting in the DPF 108.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of regenerating a NOx absorber-catalyst in an exhaust aftertreatment system comprising the NOx absorber-catalyst, an ammonia-SCR reactor, and a conduit channeling the exhaust from the NOx absorber-catalyst to the ammonia-SCR reactor, comprising:

injecting diesel fuel into a lean exhaust stream at a rate that keeps the exhaust lean;

passing the exhaust stream and fuel through a fuel reformer that catalyzes combustion of the injected fuel and thereby heats;

after the reformer has heated by the combustion to a temperature of at least 450° C., using at least one measure selected from the group consisting of increasing the fuel injection rate, reducing the exhaust oxygen concentration, and reducing the exhaust flow rate, causing the fuel injection to make the exhaust rich;

continuing to pass the exhaust stream and fuel through the heated fuel reformer, which catalyzes partial oxidation and reformation of the injected fuel to form a rich exhaust stream comprising reformate;

regenerating the NOx absorber-catalyst with the rich exhaust stream comprising reformate and in the process producing ammonia that is carried away by the exhaust stream;

drawing ambient air into the rich ammonia-containing exhaust stream downstream from the LNT using a Venturi formed in the conduit by the Venturi effect to produce an overall lean ammonia-containing exhaust-air stream; and passing the lean ammonia-containing exhaust-air stream through the ammonia-SCR reactor, which catalyzes reduction of NOx by reaction with the ammonia;

wherein the ambient air is drawn into the exhaust stream through an air inlet conduit having a first opening within the exhaust stream and a second opening outside the exhaust stream and in communication with the ambient air;

there is a difference between the velocity of air adjacent the second opening and the velocity of exhaust adjacent the first opening;

the difference in velocity is sufficient to provide a pressure differential great enough to draw ambient air into the exhaust through the inlet conduit at a rate sufficient to dilute the exhaust by at least 5%; and the conduit channeling the exhaust from the NOx adsorber-catalyst to the ammonia-SCR reactor generating a pressure at least 5 kPa below ambient.

2. The method of claim 1, wherein the static exhaust pressure is 5 kPa above ambient at the entrance to the ammonia-SCR reactor.

3. The method of claim 1, wherein:
the exhaust stream channeled by the conduit has a mean direction of flow;
the conduit comprises a bend that changes the mean direction of flow, thereby causing the flow to accelerate and concentrate to one side of the conduit creating a region of reduced pressure; and
the air inlet conduit is configured to guide the ambient air to enter the exhaust stream within the region of reduced pressure created by the bend.

4. The method of claim 3, wherein the air intake and the conduit are structured to draw the ambient air without channeling the exhaust stream through a constriction that reduces the cross-sectional area for the exhaust flow.

5. The method of claim 3, wherein the conduit is a pipe.

6. The method of claim 5, wherein the bend in the conduit is a 90° bend.

7. The method of claim 5, wherein the pipe is of a standard size for medium or heavy duty vehicles.

8. The method of claim 1, wherein:
the method is applied on a forward moving vehicle;
drawing ambient air into the exhaust comprises drawing the air through an inlet manifold positioned to enhance air pressure proximate the second opening by utilizing the movement of the vehicle through the ambient air to drive the air through the second opening.

9. A method of operating a power generation system comprising a diesel engine and an exhaust aftertreatment system comprising a NOx absorber-catalyst, an ammonia-SCR reactor, and a conduit channeling the exhaust from the NOx absorber-catalyst to the ammonia-SCR reactor, comprising:
operating the engine;
treating the engine exhaust with the exhaust aftertreatment system; and
from time-to-time, regenerating the NOx absorber-catalyst by the method of claim 1;
wherein a Venturi effect adds at least 5% air to the exhaust stream.

10. An exhaust aftertreatment system, comprising:
a fuel reformer suitable for processing an exhaust stream and functional under lean conditions to catalyze combustion of diesel fuel in the exhaust stream and thereby heat and functional under rich conditions to catalyze partial oxidation and reformation of the diesel fuel in the exhaust stream to form a rich exhaust stream comprising reformate;
a fuel injector configured to inject diesel fuel into the exhaust stream before it enters the fuel reformer;
a NOx absorber-catalyst configured to receive the exhaust stream from the fuel reformer and functional to absorb and store NOx from the exhaust stream under lean conditions and reduce NOx and regenerate its storage capacity under rich conditions;
an ammonia-SCR reactor functional to reduce NOx under lean conditions by catalyzing a reaction between NOx and ammonia;
a conduit configured to channel the exhaust stream from the NOx absorber-catalyst to the ammonia-SCR reactor; and
an air intake with a first opening within the conduit and a second opening in communication with the surroundings;
wherein the air intake and the conduit are structured to provide a flow velocity differential-driven pressure differential sufficient to draw ambient air into the exhaust when exhaust is flowing from the NOx absorber-catalyst to the ammonia-SCR reactor through the conduit and to dilute the exhaust by at least 5%; and
the conduit channeling the exhaust from the NOx adsorber-catalyst to the ammonia-SCR reactor is configured to generate a pressure at least 5 kPa below ambient.

11. The system of claim 10, wherein:
the conduit comprises a region upstream from where the air is drawn into the exhaust stream and within the upstream region the conduit reduces the cross sectional area available for the exhaust flow by half or more; and
the conduit comprises guide vanes within the upstream region that reduce the frictional loss across the region where the flow narrows by at least 50%;
whereby the conduit provides a reduced pressure for drawing in air over a reduced conduit length.

12. The system of claim 10, wherein:
the conduit comprises a region downstream from where the air is drawn into the exhaust stream and within the downstream region the conduit increases the cross sectional area available for the exhaust-air flow by a factor of two or more; and
the conduit comprises guide vanes within the downstream region that reduce the frictional loss across the region where the flow expands by at least 50%;
whereby the conduit increases the flow area over a reduced length without causing excessive back pressure.

13. A power generation system comprising a diesel engine fitted with the exhaust aftertreatment system of claim 10, wherein the exhaust aftertreatment system has no valves to block the exhaust from flowing from the engine, through the $NO_X$ absorber-catalyst, and out the air intake.

14. The system of claim 10, further comprising a diesel particulate filter arranged to treat the exhaust downstream from the $NO_X$ absorber-catalyst and upstream from the air intake.

15. The system of claim 10, wherein:
the conduit comprises a bend shaped to change the mean direction of flow of the exhaust stream and thereby cause the flow to accelerate and concentrate to one side of the conduit creating a region of reduced pressure; and
the air intake is configured to guide ambient air to enter the exhaust stream within the region of reduced pressure created by the bend.

16. The system of claim 10, wherein the flow velocity differential-driven pressure differential is sufficient to add at least 10% air to the exhaust stream when the engine is running at its peak torque speed.

17. A vehicle comprising a power generation system comprising a diesel engine fitted with the exhaust aftertreatment system of claim 10, further comprising a structure for gathering air external to the conduit, the structure being functional to increase the flow of air from the surroundings into the air intake when the vehicle accelerates forward.

18. The vehicle of claim 17, wherein the structure comprises a sleeve that fits over an exhaust pipe and is configured to channel air to the air intake.

* * * * *